(12) United States Patent
Tesanovic et al.

(10) Patent No.: US 9,125,229 B2
(45) Date of Patent: Sep. 1, 2015

(54) METHOD FOR CONFIGURING A TRANSMISSION MODE IN A WIRELESS NETWORK

(75) Inventors: Milos Tesanovic, Eindhoven (NL); Timothy James Moulsley, Eindhoven (NL); Choo Chiap Chiau, Eindhoven (NL)

(73) Assignees: Koninklijke Philips N.V., Eindhoven (NL); Sharp Kabushiki Kaisha, Osaka (JP)

( * ) Notice: Subject to any disclaimer, the term of this patent is extended or adjusted under 35 U.S.C. 154(b) by 505 days.

(21) Appl. No.: 13/520,415

(22) PCT Filed: Jan. 6, 2011

(86) PCT No.: PCT/IB2011/050052
§ 371 (c)(1),
(2), (4) Date: Jul. 3, 2012

(87) PCT Pub. No.: WO2011/083431
PCT Pub. Date: Jul. 14, 2011

(65) Prior Publication Data
US 2013/0102342 A1    Apr. 25, 2013

(30) Foreign Application Priority Data

Jan. 11, 2010  (EP) .................................... 10305027
Jan. 12, 2010  (EP) .................................... 10305032

(51) Int. Cl.
*H04B 7/00*   (2006.01)
*H04W 88/06*  (2009.01)
*H04B 7/06*   (2006.01)

(52) U.S. Cl.
CPC .............. *H04W 88/06* (2013.01); *H04B 7/063* (2013.01); *H04B 7/0623* (2013.01); *H04B 7/0658* (2013.01)

(58) Field of Classification Search
CPC .... H04B 7/024; H04B 7/0452; H04B 7/0417; H04B 7/0413; H04B 7/0632; H04B 7/0478; H04B 7/0456; H04B 7/0486; H04B 7/0482; H04B 7/0621; H01L 1/0026; H01L 5/0035; H01L 25/0204; H01L 1/0027; H01L 1/0028; H01L 1/0003; H01L 1/18
USPC ............. 455/507, 501, 39, 524, 24, 463, 513, 455/69; 370/328–330, 468; 375/267
See application file for complete search history.

(56) References Cited

U.S. PATENT DOCUMENTS 5,953,671 A  * 9/1999  Childress ....................... 455/512
8,731,089 B2 * 5/2014  Ohwatari et al. ............. 375/267

(Continued)

FOREIGN PATENT DOCUMENTS

| | | |
|---|---|---|
| WO | 2007109630 A | 9/2007 |
| WO | 2008093298 A2 | 8/2008 |
| WO | 2009114376 A1 | 9/2009 |

OTHER PUBLICATIONS

Research in Motion, "Further Discussion on Signaling of DM-RS Port for LTE-A MIMO Transmission", UK Limited, 3GPP TSG RAN WG1 Meeting #59, R1-094457, Jeju, Korea, Nov. 2009, pp. 1-6.

(Continued)

*Primary Examiner* — Sujatha Sharma (57) ABSTRACT

The present invention relates to a method for operating a communication system, said communication system comprising a primary and at least one secondary station, wherein the primary station selects a transmission mode from a set of at least two transmission modes for communicating with the secondary station, and wherein the secondary station infers the selected transmission mode based on at least one control channel characteristic.

45 Claims, 2 Drawing Sheets

(56) References Cited

U.S. PATENT DOCUMENTS

| | | | |
|---|---|---|---|
| 8,891,458 B2* | 11/2014 | Tenny | 370/329 |
| 2009/0225721 A1 | 9/2009 | Cudak et al. | |
| 2010/0240400 A1* | 9/2010 | Choi | 455/458 |
| 2010/0303028 A1* | 12/2010 | Gresset et al. | 370/329 |
| 2010/0303052 A1 | 12/2010 | Visuri et al. | |
| 2011/0080965 A1* | 4/2011 | Liu et al. | 375/260 |
| 2012/0076028 A1* | 3/2012 | Ko et al. | 370/252 |
| 2012/0114021 A1* | 5/2012 | Chung et al. | 375/211 |
| 2012/0127948 A1* | 5/2012 | Chung et al. | 370/329 |
| 2012/0134338 A1* | 5/2012 | Ko et al. | 370/330 |
| 2012/0189077 A1* | 7/2012 | Seo et al. | 375/267 |
| 2012/0236814 A1* | 9/2012 | Nishio et al. | 370/329 |
| 2012/0281544 A1* | 11/2012 | Anepu et al. | 370/241 |
| 2013/0010888 A1* | 1/2013 | Moulsley et al. | 375/267 |
| 2013/0021991 A1* | 1/2013 | Ko et al. | 370/329 |
| 2013/0301560 A1* | 11/2013 | Geirhofer et al. | 370/329 |

OTHER PUBLICATIONS

Samsung, "Discussion on Dynamic Switching vs Semi-Static Switching for SU and MU-MIMO", 3GPP TSG RAN WG1 #59, R1-094577, Jeju, Kroea, Nov. 2009, pp. 1-2.

Philips, "Configuration of Feedback Mode for MIMO Transmission", 3GPP TSG RAN WG1 Meeting #59BIS, R1-100403, Valencia, Spain, Jan. 2010, pp. 1-2.

* cited by examiner

FIG. 1

METHOD FOR CONFIGURING A TRANSMISSION MODE IN A WIRELESS NETWORK

FIELD OF THE INVENTION

The present invention relates to a method for communicating in a network, between a primary station and at least one secondary station by means of a transmission mode selected out of a plurality of transmission modes. The present invention also relates to a primary station and a secondary station communicating in accordance to this method.

This invention is, for example, relevant for mobile telecommunication networks like UMTS, UMTS LTE networks, or like broadband wireless networks or WLANs.

BACKGROUND OF THE INVENTION

Figure 1:
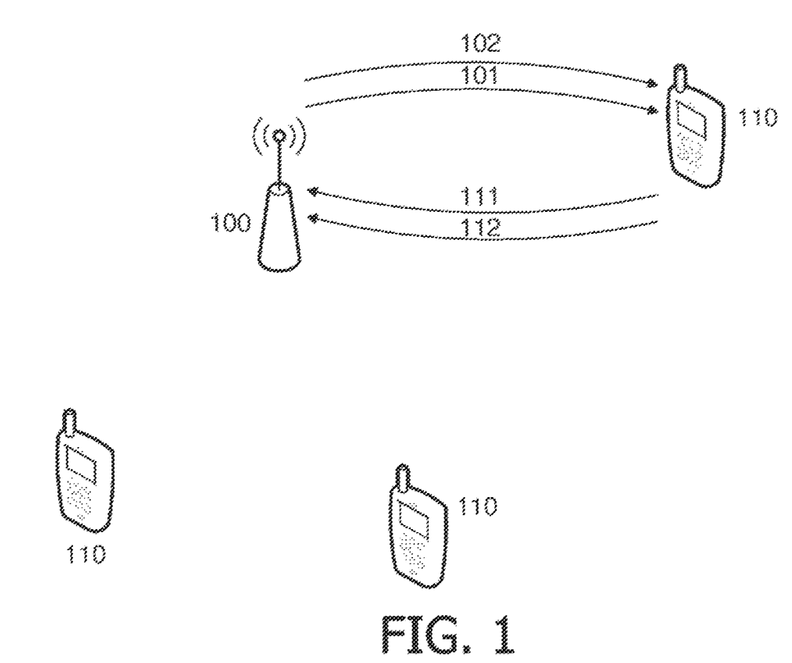
FIG. 1 already described is a block diagram of a conventional telecommunication system.

In a conventional wireless system represented on FIG. 1, a primary station 100 exchanges data with a plurality of secondary stations 110. To transmit its data, the primary station 100 transmits sends its data, on a downlink data channel 101. This downlink data channel may be adjusted over the time in response to several criterions, e.g. Quality of Service, interference, downlink channel quality. To inform, the secondary stations 110 of these changes, the primary station 100 transmits control, data (or signalling) to the secondary stations 110 on a downlink control channel 102. Similarly, the secondary stations 110 transmit their data on an uplink control channel 111. Moreover, an uplink control channel 112 is used by the secondary station to request resources for transmissions and/or for providing the primary station, with feedback on the downlink transmissions or on the channel quality state.

In many wireless systems, like mobile communication systems as UMTS LTE (Long Term Evolution), or LTE Advanced, signalling on control channels 102 or 112 is provided so that it indicates the particular time-frequency transmission resources to which the data is mapped on the data channels 101 or 111, and the transmission scheme used for that data (i.e. the format/mode in which the data itself is transmitted). In addition the secondary station may provide channel state feedback intended to assist the primary station in scheduling transmission to suitable secondary stations using appropriate transmission, resources and transmission scheme. Therefore, in general a transmission mode may be defined by one or both of a transmission scheme used by the primary station or the type of feedback provided by the secondary station.

For UMTS LTE Rel-8 downlink communication, the relevant downlink control channel 101 that includes resource allocation and transmission format information is known as Physical Downlink Control Channel (PDCCH). The message a PDCCH carries is known as Downlink Control Channel Information (DCI). The resource allocations for different transmission modes are typically indicated using different DCI formats. The secondary station (here a User Equipment or UE) is configured to receive a limited number of different DCI formats torn the possible set. Therefore configuring the types of DCI format expected by the UE in the PDCCH directly controls the transmission modes which may be expected by the secondary station, and a particular transmission mode is signalled by the particular DCI format used for resource allocation. The DCI Format contents cap also be associated with a transmission mode (e.g. in LTE a 1 bit field indicated uplink or downlink resources).

Even with several possible transmission modes, it is desirable not to specify too many DCI formats in order to reduce implementation and testing complexity. On the other hand, in the further development of LTE it is likely that additional DCI formats will need to be defined. Of particular interest, now transmission modes are discussed like the Cooperative Multi-Point transmission (CoMP transmission) or add the Multi User-MIMO (MU-MIMO) mode currently being redefined to allow additional flexibility. These new transmission modes will require to be signalled. However, it is preferable not to increase the number of DCI formats. In addition, it is desirable to avoid signalling overhead.

In LTE the transmission mode (i.e. DCI formats expected by the UE and/or feedback mode) are configured by higher layer signalling. However, if frequent changes of transmission mode are required, the use of higher layer signalling may introduce an unacceptable delay in data transmission and a significant overhead due to the signalling messages.

SUMMARY OF THE INVENTION

It is an object of the invention to propose a method which alleviates the above mentioned problems.

It is another object of the present invention to propose a method which enables to signal all the transmission, modes without requiring new DCI formats or new signalling.

To this end, in accordance with a first aspect of the invention, a method is proposed for operating a communication system, said communication system comprising a primary and at least one secondary station wherein, the primary station selects a transmission mode from a set of at least two transmission modes for communicating with the secondary station, and wherein the secondary station infers the selected transmission mode based on at least one control channel characteristic and wherein a transmission mode may be a mode of communicating data from a primary station to a secondary two or a mode of communicating feedback on the channel state front the secondary station to the primary station, or combination of the two.

This invention defines a set of mechanisms for dynamically switching between different modes of communication between a central entity (primary station) and at least one secondary station. The mechanisms described in this invention allow additional flexibility in mode switching by having the secondary station infer the correct mode from control channel characteristics. The possibility of not having to rely on explicit signalling of the correct transmission mode implies that there is no need to introduce additional control channel formats for certain new communication modes, thereby reducing the signalling overhead and the number of required blind decodes of control channel information the secondary station needs to perform in a system like LTE.

In accordance with a second aspect of the invention, it is proposed a primary station comprising means for communicating with a plurality of secondary stations by means of a plurality of transmission modes, the primary station comprising means for selecting a transmission mode out of a set of transmission modes, and means for signaling implicitly to the secondary station the selected transmission mode by changing at least one control channel characteristic.

In accordance with a third aspect of the invention, it is proposed a secondary station comprising means for communicating with a primary station in a communication system, wherein the secondary station comprises means for communicating with the primary station by means of a transmission mode selected from a set of at least two transmission modes, and wherein the secondary station comprises means to infers the selected transmission mode based on at least one control channel characteristic. These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 2 consisting of FIGS. 2A and 2B that are block diagrams showing foe operating of a telecommunication system in accordance with an embodiment of the invention.

DETAILED DESCRIPTION OF THE INVENTION

The present invention relates to a telecommunication network comprising a primary station like a base station or a NodeB or an eNodeB, and a plurality of secondary stations, like mobile stations or User Equipments.

An exemplary embodiment is implemented in a mobile network as illustrated on FIG. 1. As explained above, the downlink control channel 101 comprises at least one PDCCH (Physical Downlink Control Channel) on which a DCI is transmitted. In such a system, the DCI may have a plurality of formats, each dedicated to one transmission mode.

The Physical Downlink Control Channel (PDCCH) serves a variety of purposes. Primarily, it is used to convey the scheduling decisions to individual UEs, i.e. scheduling assignments for uplink and downlink. The PDCCH is located in the first OFDM symbols of a subframe. For frame structure type 2, PDCCH can also be mapped onto the first two OFDM symbols of DwPTS field. An additional Physical Control Formal Indicator Channel (PCFICH) carried on specific resource elements in the first OFDM symbol of the subframe is used to indicate the number of OFDM symbols for the PDCCH (1, 2, 3, or 4 symbols are possible), PCFICH is needed because the load on PDCCH can vary, depending on the number of users in a cell and the signaling formats conveyed on PDCCH.

As explained above, the information carried on PDCCH is referred to as downlink control information, or DCI. Depending on the purpose of the control, message, different formats of DCI are defined. As an example, the contents of DCI format 1 are shown in the Table 1 below as an example, DCI format 1 is used for the assignment of a downlink shared channel resource when no spatial multiplexing is used (i.e. the scheduling information is provided for one code word only). The information provided contains everything what is necessary for the UE to be able to identify the resources where to receive the PDSCH in that subframe and how to decode it. Besides the resource block assignment, this also includes information on the modulation and coding scheme and on the hybrid ARQ protocol.

TABLE 1

Contents of DCI format 1 carried on PDCCH

| Information type | Number of bits on PDCCH | Purpose |
| --- | --- | --- |
| Resource allocation header | 1 | Indicates whether resource allocation type 0 or 1 is used |
| Resource block assignment | Depending on resource allocation type | Indicates resource blocks to be assigned to the UE |

TABLE 1-continued

Contents of DCI format 1 carried on PDCCH

| Information type | Number of bits on PDCCH | Purpose |
| --- | --- | --- |
| Modulation and coding scheme | 5 | Indicates modulation scheme and, together with the number of allocated physical resource blocks, the transport block size |
| HARQ process number | 3 (TDD), 4 (FDD) | Identifies the HARQ process the packet is associated With |
| New data indicator | 1 | Indicates whether the packet is a new transmission or a retransmission |
| Redundancy version | 2 | Identifies the redundancy version used for coding the packet |
| TPC command for PUCCH | 2 | Transmit power control (TPC) command for adapting the transmit power on the Physical Uplink Control Channel (PUCCH) |
| Downlink assignment index (TDD only) | 2 | number of downlink subframes for uplink ACK/NACK bundling |

The Cyclic Redundancy Check (CRC) of the DCI is scrambled with the UE identity that is used to address the scheduled message to the UE.

For each transmission mode corresponds a DCI format. For example, DCI format 1A is used for compact signalling of resource assignment of single codeword PDSCH transmissions, DCI format 1B is used for compact signalling of resource assignment of PDSCH transmissions using closed loop preceding with rank 1 transmission. Similarly there is DCI format 1D for MU-MIMO transmission on the PSDCH. The exhaustive list of DCI formats is omitted for the sake of conciseness.

DCI (Downlink Control Information) format 0 is used on PDCCH to convoy the uplink scheduling grant, is shown in table 2 below.

TABLE 2

Contents of DCI format 0

| Information type | Number of bits on PDCCH | Purpose |
| --- | --- | --- |
| Flag for format 0/format1A differentiation | 1 | Indicates DCI format to UE |
| Hopping flag | 1 | Indicates whether uplink frequency hopping is used or not |
| Resource block assignment and hopping resource allocation | Depending on resource allocation type | Indicates whether to use type 1 or type 2 frequency hopping and index of starting resource block of uplink resource allocation as well as number of contiguously allocated resource blocks |
| Modulation and coding scheme and redundancy version | 5 | Indicates modulation scheme and, together with the number of allocated physical resource blocks, the transport block size, Indicates redundancy version to use |
| New data indicator | 1 | Indicates whether a new transmission shall be sent |

TABLE 2-continued

Contents of DCI format 0

| Information type | Number of bits on PDCCH | Purpose |
|---|---|---|
| TPC command for scheduled PUSCH | 2 | Transmit power control (TPC) command for adapting the transmit power on the physical Uplink Shared Channel (PUSCH) |
| Cyclic shift for demodulation reference signal | 3 | Indicates the cyclic shift to use for deriving the uplink demodulation reference signal from the base sequence |
| Uplink index (TDD only) | 2 | Indicates the uplink subframe where the scheduling grant has to be applied |
| CQI request | 1 | Requests the UE to send a channel quality indication (CQI) |

In accordance with a first embodiment, of the invention the primary station uses various characteristics of control channels for existing formats to implicitly indicate a transmission mode, or a change in transmission mode. Thus, a single DCI format can be used for two different transmission modes. To determine which transmission mode to select, the secondary station deduces from another transmission characteristic of the control data channel, the PDDCH in the exemplary embodiment. Thus, this permits to increase the flexibility of the transmission modes with the same number of DCI formats.

In a system like LTE the transmission mode or information about the transmission mode can be indicated by one or more of the following control channel characteristics:

A property of me PDCCH transmission, including:
  The aggregation level used, for the PDCCH (i.e. the amount of physical resource used for the control channel message.)
  Scrambling sequence applied to the PDCCH CRC
  The position of the PDCCH in the search space. Indeed, in an example of embodiment of the invention, no feed resource is scheduled for the PDCCH. As a consequence, the secondary stations must listen and decode a set of resources in a search space to determine whether one of these resources contain signalling addressed to them. The position of the resources in the search space may be used as a way of signalling a particular transmission mode to the secondary station.
A particular power ratio between CRS (Common Reference Symbols) and/or DRS (Dedicated Reference Symbols) and data
  The information may be indicated according to whether the power ratio exceeds or is below a particular threshold
  The power offset may be applied to DRS before preceding (or applied, to CRS after precoding)
The signalled transmission rank e.g.
  Rank less than or equal to N indicates MU-MIMO (e.g. N-1)
  Rank greater than M indicates SU-MIMO (e.g. M=1)
  Rank less than or equal to N indicates a switch to MU-MIMO (e.g. N=2) for subsequent transmissions
  Rank greater than M indicates a switch to SU-MIMO (e.g. M=2) for subsequent transmissions Number of codewords e.g.
  One codeword=MU-MIMO
  Two codewords=SU-MIMO
Some explicit signalling may be transmitted, but without additional bits, for example:
  Unused bits (e.g. if DCI format supports transmission of two codewords but only one codeword is indicated, then there will be spare signalling bits associated with the unused codeword)
    NDI could indicate transmission mode or switch of transmission mode Unused/reserved combination of values somewhere
    E.g. Field for Precoder/rank indication may have unused combinations
Depending on the embodiment, in multi-carrier operation, the indication of mode could be by means of a characteristic of the PDCCH on just one carrier frequency, or on more than one carrier. Depending on the embodiment, or configuration, the indication of mode could be by means of just one of a PDCCH granting uplink resources; or a PDCCH indicating a downlink transmission; or both.

Further features of the invention could include the following:
  The codebook (to be used for preceding and/or feedback) depending on one or more of the above implicit/explicit indications
  The channel state feedback mode from the UE (e.g. explicit/implicit) depending on one or more of the above implicit/explicit indications
  The codebook and/or feedback state (i.e. SU/MU-MIMO) remains the same until:
    Switched back by one of the above
    A particular value of a control channel parameter is received such as
      Transmission rank
      Number of codewords
    RRC (Radio Resource Control) signalling event e.g.
      Cell change
      Reconfiguration,
    Time-out e.g.
      Change state after a timer expires
      Timeout period depends on state
      Switch to default state after a timer expires
It is also possible to reduce the size of the search space by having different (smaller) search spaces for each DCI format. This leads to the possibility of distinguishing the formats and/or modes according to search space. As an example, in an embodiment based on LTE, it is possible to distinguish the formats and/or modes according to the location of the control message hi the search space. Effectively, different DCI formats are used for the different modes, but each DCI, format is transmitted in a different part of the search space. This avoids extending the number of blind decodes by searching for multiple DCI formats over the search space defined for a Rel-8 UE. For example, two similar DCI formats could be distinguished only by being in the first half or in the second half of the search space.

In another embodiment, a UE could infer the transmission mode from the number of codewords indicated. For example, one codeword could mean that the mode is MU-MIMO, whereas two codewords could signify SU-MIMO.

In another embodiment that can be implemented independently from the other preceding embodiments or in combination with these preceding embodiments, the channel state feedback transmitted by the UE to the eNodeB depends on the transmission mode. For example the calculation done by the UE to determine CQI could be based on an assumption of SU-MIMO, MU-MIMO or CoMP transmission. This feedback could be transmitted periodically. In a variation, the feedback mode could be determined independently of the transmission mode, but controlled (e.g. implicitly) by one or more of the mechanisms described above.

First we consider possible differences between feedback for MU-MIMO and SU-MIMO:

- Restricted transmission rank for MU-MIMO: the maximum number of layers per UE which may be used in MU-MIMO is still under discussion; however it is certain it will be lower than for the SU-MIMO case. Therefore feedback in MU-MIMO mode would typically computed subject to a different rank restriction than for SU-MIMO.
- Different codebooks for MU-MIMO and SU-MIMO; Different codebook subset restriction might be semi-statically configured for MU-MIMO and SU-MIMO.
- Explicit feedback may be preferable for MU-MIMO, implicit feedback for SU-MIMO: explicit feedback is likely to support snore accurate zero-forcing beamforming in MU-MIMO.
- Different assumptions about interference: in MU-MIMO mode, even if the feedback is implicit, a UE could report not only its own PMI, but also PMIs that would cause it minimum interference.
- Different assumptions about PDSCH power; The full eNB transmission power would not be available in MU-MIMO mode.
- Multiple types of feedback may be transmitted correspond log to different assumptions, for example under assumptions of both SU-MIMO and MU-MIMO transmission. However, the details of the reporting (e.g. the method used to compute the feedback, periodicity, fraction of the reports corresponding to each transmission mode) may be different between the two modes.

Figure 2A:
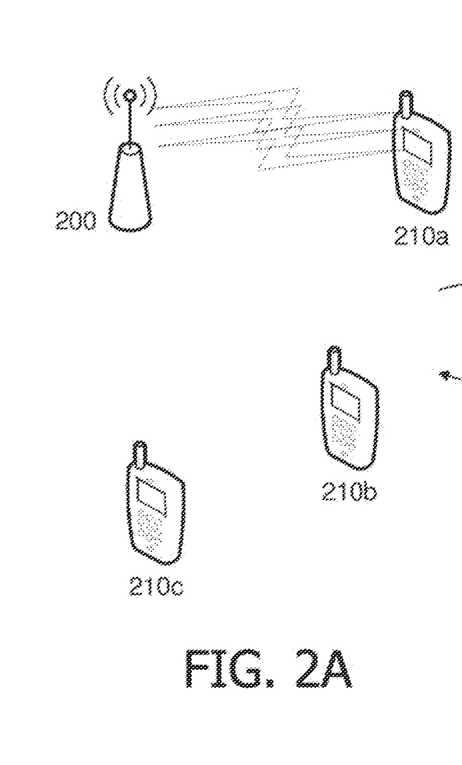
Figure 2B:
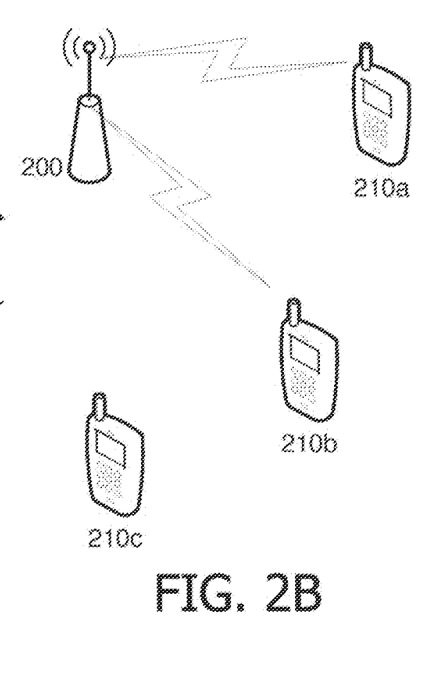

An example of embodiment is illustrated with reference to FIGS. 2A-2B. On FIG. 2A, a primary station 200 communicates with a plurality of secondary stations 210a, 210b and 210c by means of an antenna array 204. This antenna array consists in this example of 4 antenna ports. In a first operating phase illustrated on FIG. 2A, the primary station communicates in a SU-MIMO mode with the secondary station 210a. This means that the secondary station 210a is the only to receive a MIMO transmission. The transmission rank of the MIMO transmission, i.e. the number of data streams that the secondary station 210a receives simultaneously from the primary station 200, is signalled on a control channel in the first operating mode, the rank may vary from rank 2 (two streams) to rank 4 depending on the channel quality and on the amount of data to transmit or of other parameters. When the primary station needs to enter into a MU-MIMO transmission mode, i.e. a MIMO transmission where a plurality of secondary stations are communicating with the primary station simultaneously, the primary station signals to the secondary station 210a a transmission rank equal to 1.

When the secondary station 210a receives the control message indicative that the transmission, rank equals 1, the secondary station 210a is thus aware of the switch towards the MU-MIMO transmission mode. This may result in a particular behaviour for the secondary station 210a with respect to interference when entering this second operating phase. For example, the secondary station will assume interference will be present on all the available ports for a defined subset of available ports). Such second operating phase is illustrated on FIG. 2B, where the primary station 200 communicates with secondary stations 210a and 210b simultaneously in MIMO mode. The respective ranks of transmission may vary between 1 and 3. For example, the rank of the transmission to the secondary station 210a may be 3 and the rank of the transmission, to the secondary station 210b may be 1. In another example, there cast be more secondary stations communicating simultaneously.

When, the primary station 200 switches back to a SU-MIMO transmission mode with the secondary station 210a, the primary station signals a transmission rank equal to 4 to the secondary station 210a. Thereafter and as in the first operating phase, the transmission rank may vary from 2 to 4 depending on the conditions.

The values triggering the switch from one mode to another are in this example particular values of the possible ranges of the transmission, rank. These may be single values (as 1 and 4 in this example) or could, subsets of values like ranges (e.g. 1-2 for MU-MIMO, 5-8 for SU-MIMO). Moreover, the transmission is an example of the transmission characteristic causing the switch from a mode to another. However, other transmission characteristics as explained before may be chosen to trigger the switch of transmission modes. Similarly, this example is not limited to the change between MU-MIMO and SU-MIMO.

In accordance with an embodiment of the invention, it is proposed a method of operating a communication system, said communication system consisting of a primary and at least one secondary station, whereby the communication between the primary and a secondary station comprises a set of at least two transmission modes for which different transmission, parameters and/or secondary station behaviour are required; said method comprising the secondary station inferring the correct transmission mode based on at least one control channel characteristic.

In a variant of this embodiment, it is proposed that the transmission modes are SU-MIMO, MU-MIMO, and CoMP.

In another variant of this embodiment, the transmission modes comprise one or more of codebooks and feedback modes. A codebook may comprise preceding matrices or vectors representing the radio channel or a precoder recommended to the primary station by the secondary station. The secondary station may also recommend a transmission rank (i.e. a number of spatial streams or layers). Different codebook subset restriction may be applied in the different modes, where codebook subset restriction is a technique whereby particular codebook entries, and/or transmission rank are not considered by the secondary station in computing the feedback. Codebook subset restriction may be applied by semi-static configuration, or, to reduce signalling, be at least partly pre-determined (e.g. fixed by specification). The codebook contents may depend on the transmission mode. For example a DFT-based codebook may be appropriate for MU-MIMO and/or CoMP with, a different codebook construction for SU-MIMO. Further, the codebook contents may be different depending on the transmission rank, for example a DFT-based codebook may be appropriate for a transmission rank of 1 (and perhaps 2), with a different codebook construction for higher ranks. The same effect of different codebooks per mode and/or rank could be achieved by design of a single larger codebook with suitable application of codebook subset restriction (e.g. by semi-static configuration and/or pre-determined by specification).

In still another variant of the invention, it is proposed that the control channel characteristic is a characteristic of a DCI message. The suitable characteristics of the DCI message include:

a. The type of DCI format, used to indicate resource application type;
b. DCI field contents of existing DCI formats;
c. Special DCI fields used for control;
d. Number of spatial layers in existing formats.

In another variant of this embodiment, the control channel characteristic used is the position of the PDCCH carrying the control channel in the search space.

In a former variant of this embodiment, the transmission rank information, is used by the secondary station to infer the correct transmission mode. Moreover, if the transmission tank exceeds the number M, the secondary station assumes transmission parameters and behaviour for the SU mode, whereas if the transmission rank is smaller titan the number N (N≤M), the secondary station assumes transmission parameters and behaviour for the MU mode.

In another variant of this embodiment, the control channels data characteristic is the CRC appended to each PDCCH, said CRC scrambled according to the transmission mode so that the secondary station can infer the correct transmission mode.

It is also possible that the secondary station infers the transmission mode in consideration, of RRC signalling from the primary station. For example, the primary station, through RRC signalling, explicitly configures the secondary station to infer the correct transmission mode from the set of transmission modes. In another example, the secondary station is configured with a subset of transmission modes from which one may be inferred to be the correct transmission mode.

In another example, the primary station, through RRC signalling, implicitly reconfigures the transmission mode of its communication with the secondary station, said communication being reconfigured by the secondary station inferring the reconfiguration from an existing RRC signal (intended for some other purpose). Thus, said existing RRC signal may correspond to cell change. In this example, the reconfiguration may be to a default transmission mode.

It would be possible to indicate MU-MIMO operation by means of the antenna port configuration. For example, there could be a rule that antenna ports are preferentially allocated in ascending order.

For example if there are 8 antenna ports available (0, 1, 2, 3, 4, 5, 6, 7), a UE may be informed that it should receive a rank 1. PDSCH transmission on port 0. It cannot be sane whether there will be transmissions on other ports. However, if it receives an indication, of port 1, it could deduce that there is definitely another UE also scheduled at the same time using port 0. Then the UE may be able to take appropriate measures to suppress the interference e.g. by measuring the channel and transmission power from the reference symbols corresponding to the potentially interfering antenna port.

As another example, if a UE is informed of a rank 2 transmission on ports 2 and 3, it could assume another UE (or UEs) are scheduled on ports 0 and 1.

As a variant, if a UE receives an indication of a transmission on a particular port (e.g. a port other than the lowest number available), it can assume MU-MIMO rather than SU-MIMO operation. If MU-MI, then it will assume interference will be present on all the available ports (or a defined subset of available ports).

The potentially interfering transmissions could be from the same cell or a different cell. A different cell may be controlled by the same eNodeB or a different one.

The invention has particular, but not exclusive, application to wireless communication systems that employ multiple modes of transmission between a primary and secondary station, most notably MIMO and MU-MIMO modes. Examples include cellular systems such as UMTS, UMTS LTE, and UMTS LTE-Advanced, as well as wireless LANs (IEEE 802.11n) and broadband wireless (IEEE 802.16).

In the present specification and claims the word "a" or "an" preceding an element does not exclude the presence of a plurality of such elements. Further, the word, "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which am already known in the art of radio communication.

The invention claimed is:

1. A method for operating a communication system, the communication system comprising a primary station and at least one secondary station, the method comprising:
   the primary station selecting a transmission mode from a set of at least two transmission modes for communicating with the at least one secondary station,
   the at least one secondary station inferring the transmission mode selected by the primary station based on at least one control channel characteristic, wherein the at least one control channel characteristic is a transmission rank indication used by the at least one secondary station to infer the selected transmission mode, and
   the at least one secondary station inferring that the transmission mode selected by the primary station is a first transmission mode if the transmission rank exceeds a first predetermined number M, and
   the at least one secondary station inferring that the transmission mode selected by the primary station is a second transmission mode if the transmission rank is less than a second predetermined number N.

2. The method of claim 1 wherein the set of at least two transmission modes comprises at least two of the group of: a single user-multiple-input multiple-output (SU-MIMO), a multiple user-multiple-input multiple-output (MU-MIMO), a coordinated multipoint (CoMP), a set of at least one codebook, a feedback mode.

3. The method of claim 1, wherein the control channel characteristic is a characteristic of a Downlink Control Information (DCI), message, including at least one of the group of: a DCI message format used to indicate resource application type, a DCI message field contents of existing DCI formats, a special DCI field used for control, a number of spatial layers in existing formats.

4. The method of claim 1, wherein the control channel characteristic comprises a property of the control channel data transmission.

5. The method of claim 4, wherein the property of the control channel data transmission includes at least one of the group of: a position of control channel data in a search space, a scrambling sequence applied to at least a part of the control channel data, an amount of physical resource used for the control channel data.

6. The method of claim 5, wherein the scrambling sequence is applied to a Cyclic Redundancy Check of the control channel data.

7. The method of claim 1, wherein the control channel characteristic comprises a RRC signaling transmitted by the primary station.

8. The method of claim 7, wherein the RRC signaling indicates to the at least one secondary station how to infer the selected transmission mode from the set of at least two transmission modes.

9. The method of claim 7, wherein the RRC signaling indicates a subset of transmission modes from which one may be inferred by the secondary station to be the selected transmission mode.

10. The method of claim 7, wherein the primary station, through RRC signaling, reconfigures the transmission mode of its communication with the secondary station, the communication being reconfigured by the at least one secondary station inferring the reconfiguration from an existing RRC signal.

11. The method of claim 10, wherein the existing RRC signal corresponds to a cell change.

12. The method of claim 10 wherein the reconfiguration is to a default transmission mode.

13. The method of claim 1, wherein following a change in transmission mode there is an automatic reconfiguration to a default transmission mode after the expiration of a timer.

14. The method of claim 13, wherein a change in transmission mode resets the timer.

15. The method of claim 1, wherein, the first transmission mode is a SU-MIMO mode, and wherein the second transmission mode is a MU-MIMO mode.

16. A primary station for use in a communication system, the primary station comprising:
a transceiver configured to communicate to a plurality of secondary stations based on a transmission mode selected by the primary station from among a set of at least two transmission modes,
a processor configured to select a transmission mode from among a set of at least two transmission modes,
wherein the primary station signals to the secondary station a transmission rank indication, the transmission rank indication being used by the secondary station to infer the selected transmission mode,
wherein a first transmission mode selected by the primary station corresponds to a transmission rank which exceeds a first predetermined number M, and wherein a second transmission mode selected by the primary station corresponds to a transmission rank which is less than a second predetermined number N.

17. The primary station of claim 16 wherein the set of at least two transmission modes comprises: a single user-multiple-input multiple-output (SU-MIMO), a multiple user-multiple-input multiple-output (MU-MIMO), a coordinated multipoint (CoMP), a set of at least one codebook, a feedback mode.

18. The primary station of claim 16, wherein the control channel characteristic is one of: a characteristic of a Downlink Control Information, DCI, message, including at least one of a DCI message format used to indicate resource application type, a DCI message field contents of existing DCI formats, a special DCI field used for control, a number of spatial layers in existing formats.

19. The primary station of claim 16, wherein the control channel characteristic comprises a property of the control channel data transmission.

20. The primary station of claim 19, wherein the property of the control channel data transmission includes one of the group of: a position of control channel data in a search space, a scrambling sequence applied to at least a part of the control channel data, an amount of physical resource used for the control channel data.

21. The primary station of claim 20, wherein the scrambling sequence is applied to a Cyclic Redundancy Check of the control channel data.

22. The primary station of claim 16, wherein the control channel characteristic comprises a RRC signaling transmitted by the primary station.

23. The primary station of claim 22, wherein the RRC signaling indicates to a secondary station how to infer the selected transmission mode from the set of at least two transmission modes.

24. The primary station of claim 22, wherein the RRC signaling indicates a subset of transmission modes from which one may be inferred to be the selected transmission mode.

25. The primary station of claim 24, wherein the primary station, through RRC signaling, reconfigures the transmission mode of its communication with the secondary station, the communication being reconfigured by the secondary station inferring the reconfiguration from an existing RRC signal.

26. The primary station of claim 25, wherein the existing RRC signal corresponds to a cell change.

27. The primary station of claim 25 wherein the reconfiguration is to a default transmission mode.

28. The primary station of claim 25, wherein following a change in transmission mode there is an automatic reconfiguration to a default transmission mode after the expiration of a timer.

29. The primary station of claim 25, wherein a change in transmission mode resets the timer.

30. A secondary station for use in a communication system, the secondary station comprising:
a transceiver configured to communicate with a primary station based on a transmission mode selected by the primary station from among a set of at least two transmission modes,
a processor configured to infer the transmission mode based on at least one control channel characteristic,
wherein the at least one control channel characteristic is a transmission rank indication used by the at least one secondary station to infer the selected transmission mode,
the processor being further configured to infer that the transmission mode selected by the primary station is a first transmission mode if the transmission rank exceeds a first predetermined number M, and
the processor being further configured to infer that the transmission mode selected by the primary station is a second transmission mode if the transmission rank is less than a second predetermined number N.

31. The secondary station of claim 30, wherein the set of at least two transmission modes comprises: a single user-multiple-input multiple-output (SU-MIMO), a multiple user-multiple-input multiple-output (MU-MIMO), a coordinated multipoint (CoMP), a set of at least one codebook, a feedback mode.

32. The secondary station of claim 30, wherein the control channel characteristic is one of: a characteristic of a Downlink Control Information, DCI, message, including at least one of a DCI message format used to indicate resource application type, a DCI message field contents of existing DCI formats, a special DCI field used for control, a number of spatial layers in existing formats.

33. The secondary station of claim 30, wherein the control channel characteristic comprises a property of the control channel data transmission.

34. The secondary station of claim 33, wherein the property of the control channel data transmission includes one of: a position of control channel data in a search space, a scrambling sequence applied to at least a part of the control channel data, an amount of physical resource used for the control channel data.

35. The secondary station of claim 34, wherein the scrambling sequence is applied to a Cyclic Redundancy Check of the control channel data.

36. The secondary station of claim 30, wherein the control channel characteristic comprises a RRC signaling transmitted by the primary station.

37. The secondary station of claim 36, wherein the RRC signaling indicates to the at least one secondary station how to infer the selected transmission mode from the set of at least two transmission modes.

38. The secondary station of claim 36, wherein the RRC signaling indicates a subset of transmission modes from which one may be inferred by the secondary station to be the selected transmission mode.

39. The secondary station of claim 36, wherein the secondary station infers a reconfiguration of the transmission mode of its communication with the primary station from an existing RRC signal.

40. The secondary station of claim 36, wherein the existing RRC signal corresponds to a cell change.

41. The secondary station of claim 36, wherein the reconfiguration is to a default transmission mode.

42. The secondary station of claim 30, wherein following a change in transmission mode there is an automatic reconfiguration to a default transmission mode after the expiration of a timer.

43. The secondary station of claim 42, wherein a change in transmission mode resets the timer.

44. A method of operating a primary station for communicating, with a plurality of secondary stations, the method comprising the acts of:
in a primary station:
a transceiver communicating with a plurality of secondary stations based on a transmission mode selected by the primary station from among a set of at least two transmission modes,
a processor selecting a transmission mode from among a set of at least two transmission modes,
wherein the primary station signals to the secondary station a transmission rank indication, the transmission rank indication being used by the secondary station to determines the selected transmission mode,
wherein a first transmission mode selected by the primary station corresponds to a transmission rank which exceeds a first predetermined number M, and
wherein a second transmission mode selected by the primary station corresponds to a transmission rank which is less than a second predetermined number N.

45. A method of operating a secondary station for communicating with a primary station, the method comprising the steps of:
in the secondary station:
a transceiver communicating with a primary station based on a transmission mode selected by the primary station from among a set of at least two transmission modes,
a processor determine the transmission mode based on at least one control channel characteristic,
wherein the at least one control channel characteristic is a transmission rank indication used by the at least one secondary station to determines the selected transmission mode,
the processor being further configured to determine that the transmission mode selected by the primary station is a first transmission mode if the transmission rank exceeds a first predetermined number M, and
the processor being further configured to determine that the transmission mode selected by the primary station is a second transmission mode if the transmission rank is less than a second predetermined number N.

* * * * *